(12) United States Patent
Larsson

(10) Patent No.: US 6,531,086 B1
(45) Date of Patent: Mar. 11, 2003

(54) METHOD AND DEVICE FOR MANUFACTURING THREE-DIMENSIONAL BODIES

(75) Inventor: Ralf Larsson, Mölnlycke (SE)

(73) Assignee: Speed Part RP AB, Molnlycke (SE)

( * ) Notice: Subject to any disclaimer, the term of this patent is extended or adjusted under 35 U.S.C. 154(b) by 0 days.

(21) Appl. No.: 09/403,932

(22) PCT Filed: Apr. 30, 1998

(86) PCT No.: PCT/SE98/00808
§ 371 (c)(1),
(2), (4) Date: Oct. 27, 1999

(87) PCT Pub. No.: WO98/51464
PCT Pub. Date: Nov. 19, 1998

(30) Foreign Application Priority Data

Apr. 30, 1997 (SE) ................................. 9701663

(51) Int. Cl.$^7$ ........................... B29C 35/08; B29C 41/02
(52) U.S. Cl. ........................ 264/497; 264/109; 264/113; 264/123; 264/125; 264/126; 264/492; 425/174.4; 425/218
(58) Field of Search ................................. 264/109, 113, 264/123, 125, 126, 492, 497; 425/174.4, 218

(56) References Cited

U.S. PATENT DOCUMENTS 5,284,695 A  *  2/1994  Barlow et al. ............... 264/497
5,387,380 A     2/1995  Cima et al. .................... 264/69
5,512,122 A     4/1996  Sokyrka ................... 156/275.5

FOREIGN PATENT DOCUMENTS

EP  0470705 A2      2/1992
FR  2567668 A1      1/1986
FR  2692053 A1  * 12/1993

OTHER PUBLICATIONS

International Search Report (Mailed Jul. 29, 1998).

* cited by examiner

*Primary Examiner*—Leo B. Tentoni
(74) *Attorney, Agent, or Firm*—Samuels, Gauthier & Stevens, LLP

(57) ABSTRACT

A method for producing three-dimensional bodies of a large number of mutually connected layers of a particle-shaped material such as a powder, and where the information of the appearance of each layer is achieved from a computer's CAD-unit or similar. An essentially even particle layer (7) of building material is applied on a support base (6) and on a masking device (9) is arranged a masking pattern in accordance with the information from the CAD-unit, which masking device is led over said particle layer and close to it. A radiation producer (8) is arranged or is led over the masking device (9), whereby the particles which are not covered by the masking pattern are exposed for radiation and thereby are attached to each other. The masking pattern is removed from the masking device and new sequences in accordance with the above are carried through until the three-dimensional body (19) is produced.

24 Claims, 3 Drawing Sheets

METHOD AND DEVICE FOR MANUFACTURING THREE-DIMENSIONAL BODIES

The present invention concerns a method and a device for manufacturing three dimensional bodies of a great number of mutually connected layers of a particle shaped material, such as a powder, and where the information of the appearance of each layer is achieved from a computer's CAD-unit or similar.

BACKGROUND AND PROBLEM

Manufacturing of prototypes from originals in A form of separate CAD-drawings, where the information from each layer is used for stiffening or melting together material for a three dimensional body, is known. U.S. Pat. No. 4,575,330 describes the use of a UV-laser beam for hardening (stiffening) the surface layer in a reservoir with liquid plastic (photopolymer). In order to be able to build details with thin walls and with high precision, the focus point (diameter) of the laser is minimized to fractions of 1 millimeter. The laser beam must illuminate all surfaces, which shall become solid. That takes a long time to produce a detail.

EP-A2 470 705 describes a three dimensional modeling, where the speed has been increased by illuminating the whole surface at one time with a large UV-lamp. The UV-light is shielded with toner from a laser printer on a glass plate. In order to manage details with overhang a support structure is built with the aid of wax, which solidify.

The drawbacks with reactive liquid plastics are that they are dangerous for personnel and for the environment, and that variations of different qualities are limited.

In order to avoid this and the use of a support structure, a plastic or wax powder is used, where the unsintered powder bakes in the proceeding layers and in this way supports possible "overhang"; such as when a hat on a mushrom is made. These machines, e.g. from the German firm EOS GmbH and the US-firm DTM Inc. use a controllable laser beam to selectively melt the powder. In order to increase the speed, one heats the powder reservoir to a temperature just below the melting point of the powder and let the laser beam increase the temperature to the degrees that are necessary for melting/sintering together the powder. It will take 10–20 hours to manufacture a prototype detail of normal size. Machines based on laser or UV technique are very expensive to buy. The costs are in the order of 3–6 million SEK.

The purpose with the present invention is to eliminate the above-mentioned drawbacks and to achieve:
- three dimensional bodies, also such with thin walls and with high precision
- articles with overhang without the aid of support structures
- a method which is not dangerous for personnel and for the environment
- large qualitative possibilities of variations
- a simple, inexpensive and reliable machine equipment
- fast manufacturing of three dimensional bodies These objects have been achieved by the steps by applying an even particle layer on a support surface, a masking device that is arranged to provide a masking pattern in accordance with the information from the CAD-unit. The masking device is led over the particle layer. A radiation producer is arranged or is led over the masking device, whereby the particles, which are not covered by the masking pattern, are exposed to radiation and thereby are attached to each other. The masking pattern is removed from the masking device and that new sequences in accordance with the above are carried through until the three dimensional body is produced.

DESCRIPTION OF THE DRAWINGS

The invention will be described in more detail with reference to the enclosed drawings, which show by way of example embodiments of the invention.

DESCRIPTION OF AN EMBODIMENT

Figure 1:
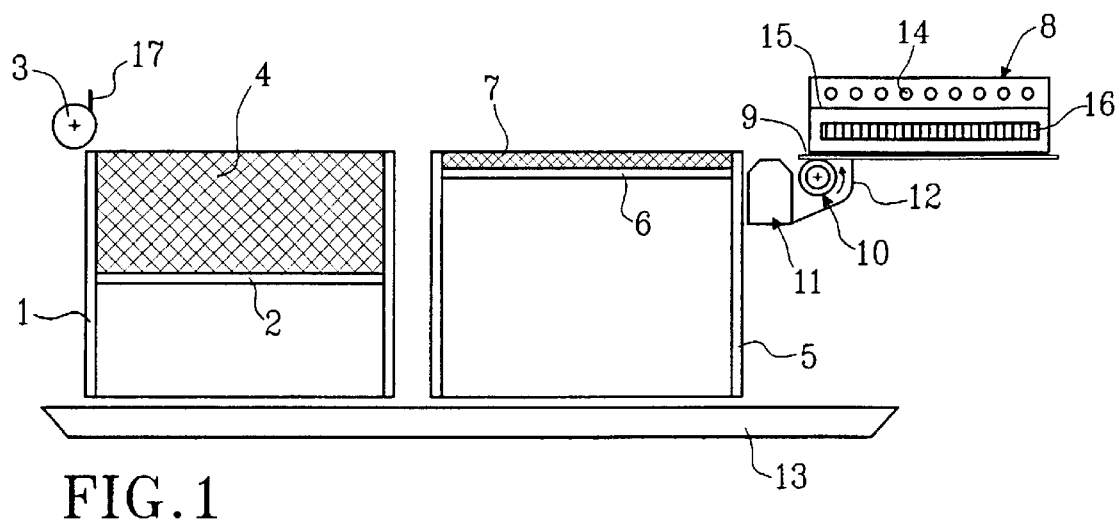
FIGS. 1–9 demonstrate the sequential steps performed by a device used for manufacturing three-dimensional bodies in accordance with the invention.

The inventive idea is to use a heat medium, such as IR-radiation, permeable means, which is applied to a temporary, negative masking. The negative masking is controlled by a computer, which shields and thereby prevents penetration of the radiation, while free regions permit penetration of radiation to an underlying surface. The free regions consist of a particle shaped material, e.g. a meltable or sinterable powder. The masking is done with a masking device 9, e.g., a transparent silica plate 9a, on which a developer 11, for instance in the form of a write head, has deposited a masking layer. The masking device is so arranged that either the plate 9a and/or the write head are movable in a longitudinal direction. Conventional toner powder, which is used in writers is not suitable because it comprises a thermoplastic adhesive, which would permanently melt and adhere the toner on the plate. An example of an infrared masking powder 4, which does not melt and adhere, is aluminum oxide, which has a high melting point and degree of reflection.

To make it possible to apply the masking powder, the silica plate 9a can be covered with an electrically conductive but transparent layer, for instance, shielding of viewing screens for so called smart windows. Another way is to place a separate conduit behind the silica plate opposite the write head. It is important that the IR-radiation hits the silica plate as parallel as possible, so that the beams do not shine below the masking and cause bad accuracy. This can be arranged with beams directing means 16, such as a collimator, applied between IR-lamps 14 and the silica plate 9a and which makes the IR-beams parallel. The construction's movements can mechanically be coordinated, for instance, the same movement, which transfers the masking device 9, or to spread and rake out a new powder layer.

The wavelength of the IR-radiation shall be adapted to the emission maximum of the plastic powder, i.e., so that most of the energy is absorbed in the most upper most powder layer. This produces highly efficient thin layers and short heating times to melt/sinter the powder material. The high absorption can allow one to supply high radiation energy, which is concentrated to the surface of the powder. This is a condition for fast production of thin layers, before heat spreading occurs through conduction and internal transmission radiation destroy the accuracy of the melted layers.

Another way or in combination with the above is to increase absorption by choosing a plastic powder, which has a large proportion of polar OH-groups or double bonds in the molecular chains. If one chooses IR-radiation in the medium-wave range and with an emission maximum at 860 nanometers, the vibration frequency for these atomic bonds coincides with the IR-radiation and a heavy heat release will occur. The powder material can consist of a thermoplastic material, such as nylon comprising one or more different pigment, e.g., carbon black or a filling agent, which can either be drymixed or mixed during manufacturing before pulverization.

The powder can also be provided with additives, which increase certain properties, such as reinforcement, and can be mixed with powders with different melt intervals in order to minimize shrinking when stiffening. The powder can have different particle sizes for increasing its dry volume weight (density). High temperature powders, such as ceramics, can be used to increase the strength, which is possible after sintering in an oven, where the plastic adhesive can be combusted and the high temperature material can be sintered. The powder material can also have thermo hardening properties, i.e., so that the powder after sintering/melting makes a heat reactive hardener to cross-bind the chains of the plastic molecules. An example of such a plastic can be epoxide with amine hardener. Also, a W-hardener can be added to the powder in order to, at a later occasion, expose the three-dimensional body for after hardening by irradiation in lamp- or sunlight.

DESCRIPTION OF THE FUNCTION

FIG. 1 shows a position shortly after the start position, with a filled powder reservoir 1, an up and down moveable base 2, and an already laid out powder layer 7, which has been transferred to a building reservoir 5. The building reservoir 5 includes a likewise up and down moveable base 6. FIG. 1 also shows a masking device 9 and a radiation producer 8 is in a parking position.

Figure 2:
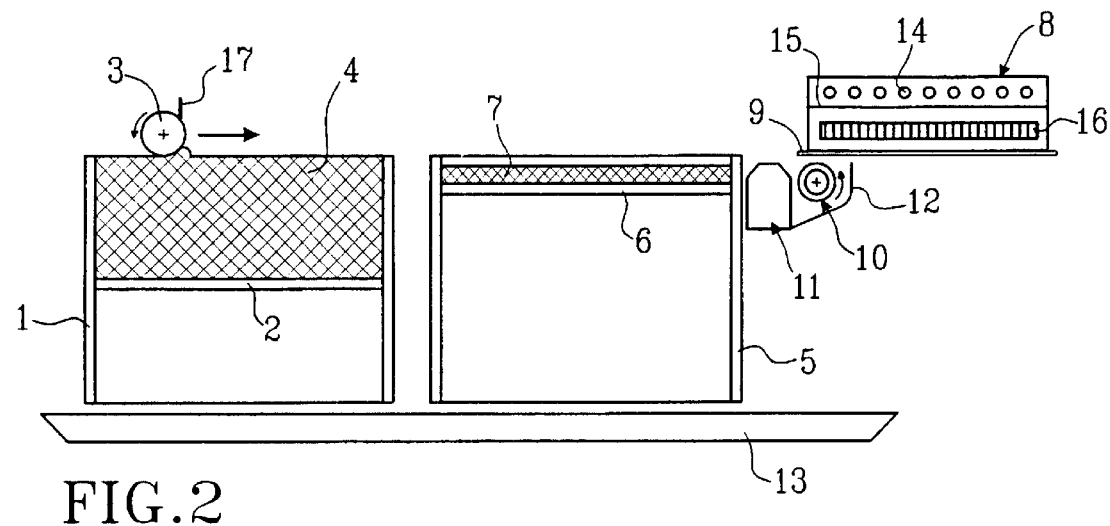

In FIG. 2, the base 2 in the powder reservoir I has been lifted one step and the base 6 in the building reservoir has been lowered corresponding to the thickness of the powder layer (e.g. 0, 1 mm). A spreader device, e.g., in the form of a wiper roll 3, rotates and at the same time it is moved across the powder reservoir 1 while scraping a powder layer. The wiper roll 3 also is transported to a building reservoir 5 and is again spread out in a layer. A scraper 17 keeps the roll clean during its rotation.

Figure 3:
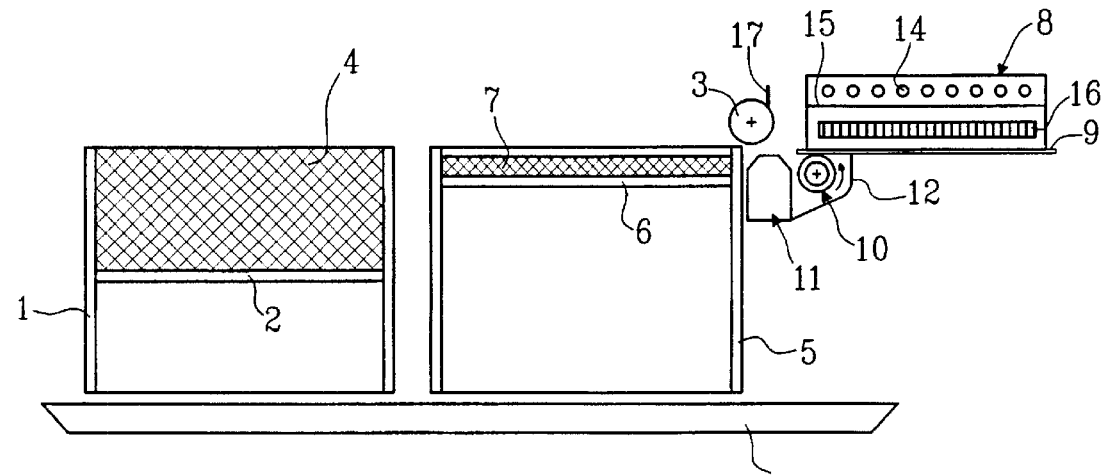

In FIG. 3, the wiper roll 3 has laid out a thin even powder layer above the earlier layer 7. Excess powder falls down on an underlying collecting reservoir 13.

Figure 4:
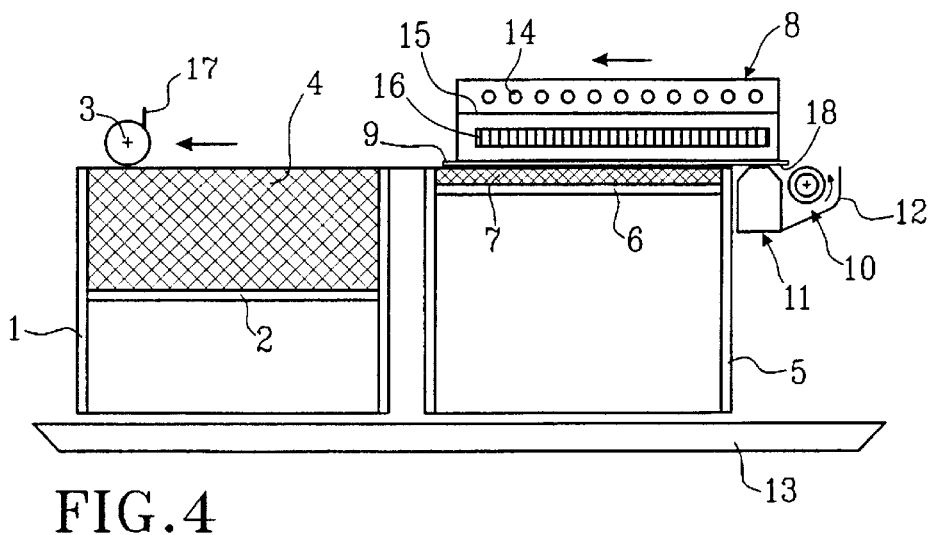

In FIG. 4 the wiper roll 3 goes back to its start position and at the same time the masking device 9 with the IR-producer 8 moves over a developer 11, which in the shown embodiment is a writer head that deposits a masking layer of, for instance, aluminia powder in accordance with information received from a not shown CAD-unit on the masking device, which can be a glass plate.

Figure 5:
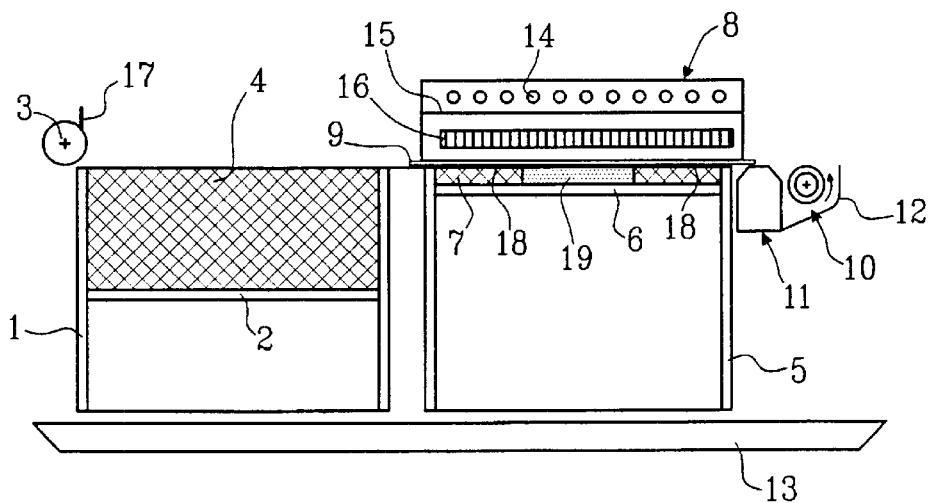

FIG. 5 shows the melting phase, during which a shielding device 15, for instance, in the form of a Venetian blind, is open and allows the IR-radiation from the ignited IR-lamps to pass. The IR-beams are directed and made parallel with a collimator 16 and thereafter pass those parts of the glass plate, which are not covered by the masking pattern 18. Thereby the exposed parts of the powder layer 7 are melted to an interconnected structure 19.

Figure 6:
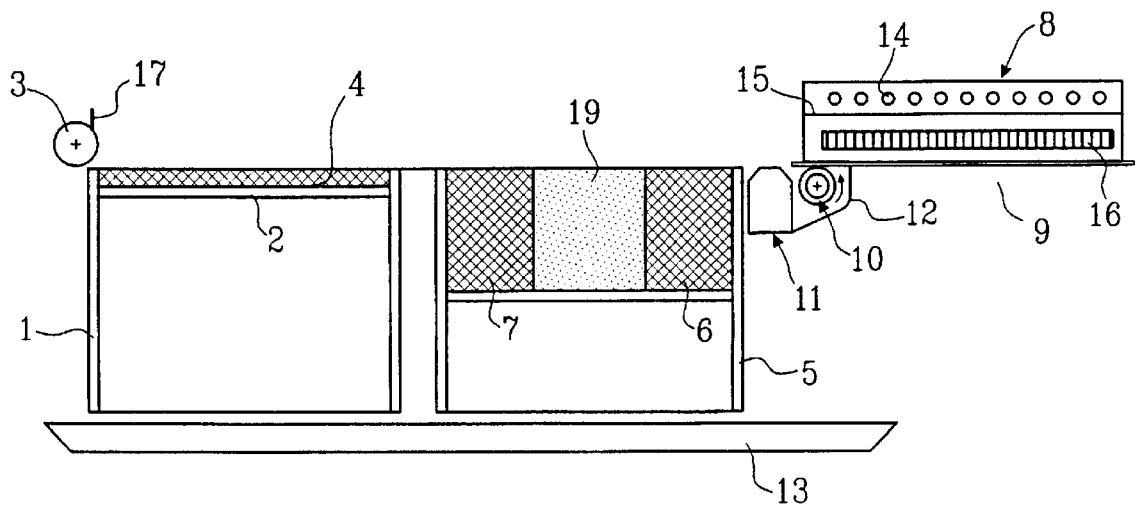

FIG. 6 shows a finished three-dimensional body 19 after applying several repeated sequences before the surrounding loose particle shaped material has been removed.

Figure 7:
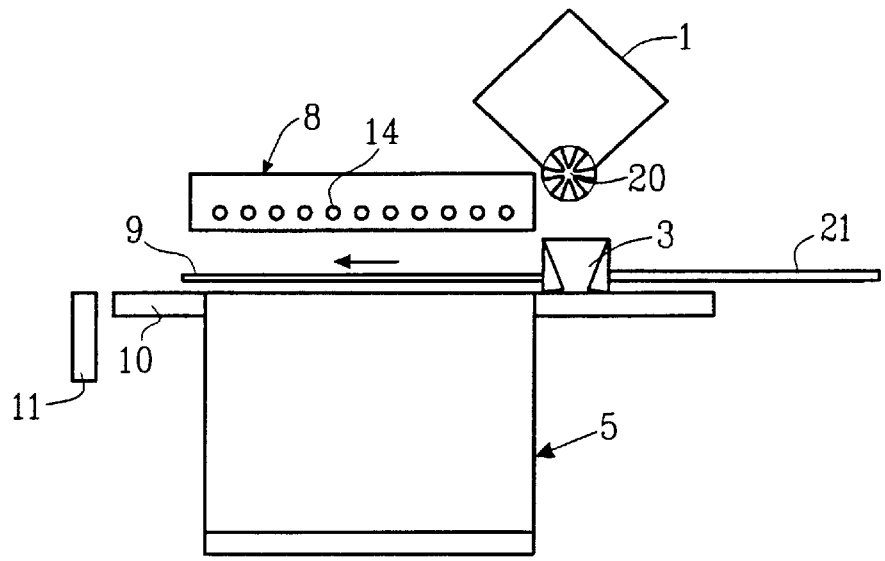
Figure 8:
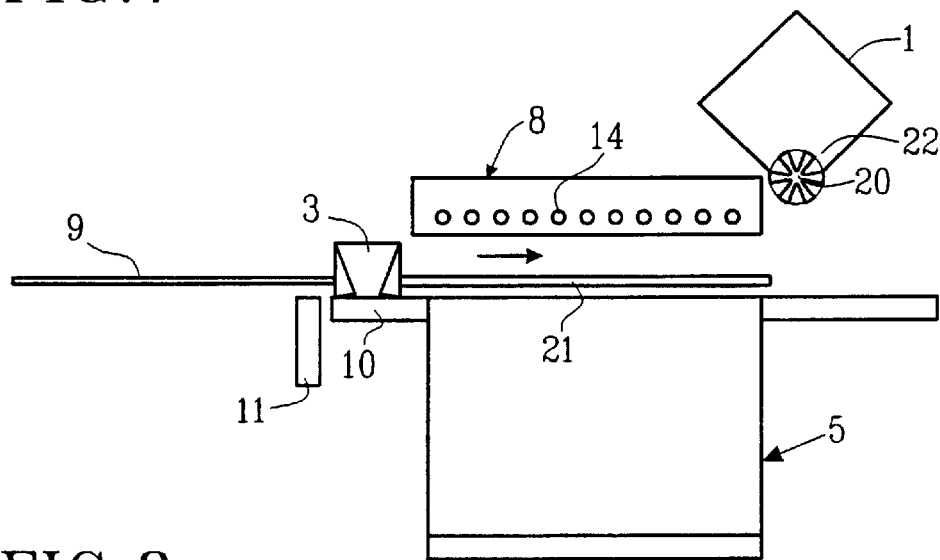
Figure 9:
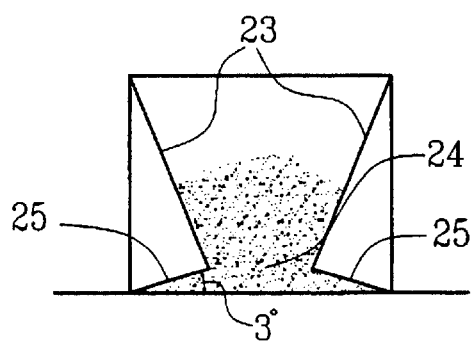

In the embodiment shown in FIGS. 7 and 8, the powder reservoir 1 or the powder magazine is arranged obliquely above the building reservoir 5 and is in the shown embodiment a transport package, which rest on one of its borders, in which corner part an outlet port is arranged. The inclined V-base of the package leads to that the content without extra measures is emptied out. In connection with the outlet port is arranged a dosing device 20, which in an active position delivers powder to one below that located spreading device 3. In this embodiment, the spreading device 3 is a wiper tray, which is horizontally displaceable over the building reservoir 5. One side of the wiper tray 3 is connected with the glass plate of the masking device 9 and its opposite side is possibly connected with a compression plate 21.

FIG. 7 shows a start position, in which the wiper tray 3 is in a position for fetching a certain amount of powder, which during the tray's displacement movement to the opposite end of the building reservoir 5 is applied in an even layer. During this movement, the glass plate 9 passes the developer 11, which through electrostatical electrification projects a masking pattern on the glass plate in a form of a negative picture of that surface section through the three-dimensional body which should be manufactured.

When the wiper tray is in its other end position the compression plate will be located right over the newly laid out powder layer 7. In this position the powder layer is moved upwards against the compression plate 21, whereby an even layer of uniform thickness is obtained. In this position the tray can emit possible excess powder to the eliminator 10. When the wiper tray is back in its start position, the glass plate 9 is in its exact position over the building reservoir 5 and the melting phase can start. The IR-lamps 14 can in this embodiment be secured right opposite and above the building reservoir 5.

LIST OF REFERENCE NUMBER

1 Powder reservoir
2 Moveable base of the powder reservoir
3 spreading device/wiper roll/wiper tray
4 Powder
5 Building reservoir
6 Moveable base of the building reservoir
7 Powder layer
8 IR-radiation producer
9 Masking device/glass plate
10 Eliminator, e.g. a clearing device
11 Developer 11, e.g. computer controlled write head
12 Collecting reservoir for masking powder
13 Collecting reservoir for excess powder
14 IR-lamps
15 Shielding device
16 Collimator
17 Scraper 18 Masking pattern
19 Interconnected structure
20 Dosing device
21 Compression plate
22 Outlet opening of the powder reservoir
23 Side walls
24 Outlet opening of the wiper tray
25 Guiding plates

What is claimed is:

1. A device for producing three dimensional bodies of a large number of mutually connected layers of a particle shaped building material, and where the information of the appearance of each layer is achieved from a computer CAD-unit, comprising:

applying essentially even particle layer of building material on a support base, arranging on a masking device a masking pattern in accordance with the information from the CAD-unit, which masking device is led over said particle layer, arranging a radiation producer over the masking device, whereby the particles which are not covered by the masking pattern are exposed for radiation and thereby are attached to each other, and removing the masking pattern from the masking device, and performing processing until the three dimensional body is produced.

2. A method according to claim 1, wherein the particle layer is applied with the aid of a spreading device which transfers the particles from a reservoir and spread them over the support base.

3. A method according to claim 1, wherein during movement of the masking device from a parking position beside the support base to an active position over the support base the masking device passes one to the CAD-unit connected computer controlled developer, which produces an electrostatical pattern of the layer in question in the form of a layer of masking powder on the support base.

4. A method according to claim 3, wherein the CAD-unit connected computer controlled developer is moved over the support base, whereby an electrostatical pattern of the layer in question in the form of a layer of masking powder is produced.

5. A device for producing three dimensional bodies of a large number of mutually connectable layers of a particle shaped building material, and where the information about each layer's appearance is achieved from an original, from a computer CAD-unit, comprising:

a spreading device arranged to distribute an essentially even particle layer on a support base, a developer is arranged to generate or apply a masking pattern in accordance with the original, from the CAD-unit, on a masking device, a radiation producer configured over the masking device, whereby the particles which are not covered by the masking pattern are exposed for radiation and thereby are connected to each other, and an eliminator arranged to remove the existing masking pattern on the masking device.

6. A device according to claim 5, wherein the spreading device includes a wiper roll or a wiper tray, which is arranged to transport the particles from a powder reservoir and spread the particles in an even layer all over the support base.

7. A device in accordance with claim 5, wherein the powder reservoir is a transport package, which at least during the feeding out of the powder is arranged over the support base, that in the bottom of the package is arranged an outlet opening and in connection to that a dosing device for the powder, and that the spreading device and/or the support base are moveable in relation to each other.

8. A device in accordance with claim 5, wherein the spreading device is one over the support base and the powder layer respectively moveable powder reservoir, which is arranged to meter and spread out via at least one outlet opening a new powder layer in at least one direction of motion.

9. A device in accordance with claim 8, wherein the inside of the wiper tray and the transport package has inwards inclined side walls and guiding plates at the outlet opening of the wiper tray are arranged in the direction of motion of the tray, which guiding plates are arranged to make an acute angle against the support base for compression of the powder layer in connection with or after the spreading.

10. A device in accordance with claim 5, wherein the powder layer and a compression plate are arranged moveable in relation to each other and arranged to be pressed in contact with one another.

11. A device in accordance with claim 10, wherein the compression plate is arranged as a cooling member for cooling the powder layer.

12. A device in accordance with claim 5, wherein the spreading device is one over the powder layer moveable, rotateable powder roll, whose rotation of speed and direction of motion are adjustable.

13. A device in accordance with claim 6, the powder reservoir is provided with an up and down moveable base, which when producing each layer is arranged to lift up the powder mass in the powder reservoir corresponding to the thickness or the volume of a layer, and that the support base is an up and down moveable bottom of a building reservoir, which when producing each layer is arranged to lower the bottom in the building reservoir corresponding to the thickness or the volume of a layer.

14. A device in accordance with claim 13, wherein the walls of the building reservoir made/sintered powder, layer by layer, in the same way as the three dimensional body, the walls are fastened to the moveable base plate, and the walls of the building reservoir are generated by a fix or by the masking device controlled, for the IR-radiation transparent pattern.

15. A device in accordance with claim 13, wherein the upper circumference of the building reservoir defines a surface which is larger than the underlying opening, which is tightening border for the reservoir built in layers.

16. A device in accordance with claim 5, wherein the radiation producer comprises a collimator, which is made of lamellas in at least two different crossing planes above each other, alternatively in combination with a spreading device.

17. A device in accordance with claim 5, wherein the building material is powder that is preheated to a temperature which is lower than the sintering/melting temperature.

18. A device in accordance with claim 17, wherein the powder is preheated with the aid of infrared radiation member with lower intensity than during sintering and/or by means of that the masking layer is partly transparent.

19. A device in accordance with claim 5, wherein the masking device comprises a writer unit, a developer, and a flowing crystal display for production of the desired masking pattern.

20. A device in accordance with claim 5, wherein the masking device is a disconnectable and connectable mirror, which is arranged to take at the same time two different states, one in which the mirror is reflecting and another in which it is transparent, and that said states in controllable with information from a CAD-unit in correspondence to a desired masking pattern.

21. A device in accordance with claim 5, wherein that the developer is arranged to cooperate with a transparent plate, on which a layer of masking powder is applied electrostatically.

22. A device in accordance with claim 5, wherein the developer comprises one in or on a transparent plate arranged electrode matrix with a large number of annular-shaped control electrodes, which electrode matrix on one side is provided with a background electrode and which opposite side is turned towards a dosing device for masking material, and that the potentials applied on the control electrodes are variable in accordance with information from the computer's CAD-unit.

23. A device in accordance with claim 5, wherein the eliminator is a cleaning device, which is arranged to clean the transparent layer from the masking material forming the masking layer, whereby possible excess material is returned to the masking device.

24. A device in accordance with claim 23, wherein the eliminator is arranged to change the state of voltage in the display so that the masking pattern is erased.

* * * * *